United States Patent
Zhu

(10) Patent No.: US 11,588,604 B2
(45) Date of Patent: Feb. 21, 2023

(54) METHOD AND APPARATUS FOR TRANSMITTING INFORMATION, BASE STATION, AND USER EQUIPMENT

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 69 days.

(21) Appl. No.: 17/256,264

(22) PCT Filed: Jun. 29, 2018

(86) PCT No.: PCT/CN2018/093857
§ 371 (c)(1),
(2) Date: Dec. 28, 2020

(87) PCT Pub. No.: WO2020/000447
PCT Pub. Date: Jan. 2, 2020

(65) Prior Publication Data
US 2021/0226756 A1    Jul. 22, 2021

(51) Int. Cl.
*H04L 5/00* (2006.01)
*H04W 72/04* (2009.01)
(Continued)

(52) U.S. Cl.
CPC ......... *H04L 5/0053* (2013.01); *H04W 72/042* (2013.01); *H04W 72/0453* (2013.01); *H04W 74/0808* (2013.01)

(58) Field of Classification Search
CPC .............................. H04W 84/02; H04W 72/12
See application file for complete search history.

(56) References Cited

U.S. PATENT DOCUMENTS

2017/0230933 A1* 8/2017 Radulescu ............ H04W 16/14
2017/0303246 A1   10/2017 Wang et al.
2018/0042019 A1    2/2018 Taylor

FOREIGN PATENT DOCUMENTS

CN    105515741 A    4/2016
CN    107135461 A    9/2017
(Continued)

OTHER PUBLICATIONS

English translation of International Search Report in International Application No. PCT/CN2018/093857, dated Mar. 27, 2019.
(Continued)

*Primary Examiner* — Ayaz R Sheikh
*Assistant Examiner* — Debebe A Asefa
(74) *Attorney, Agent, or Firm* — Finnegan, Henderson, Farabow, Garrett & Dunner, L.L.P.

(57) ABSTRACT

Provided in the present disclosure are a method and apparatus for transmitting information, a base station, and user equipment, the method including: determining transmission configuration information of an unlicensed spectrum, the transmission configuration information being used to indicate various data transmission starting positions within a preset time window; sending the transmission configuration information to user equipment; performing information transmission with the user equipment using a channel of the unlicensed spectrum according to the transmission configuration information. By employing the method for transmitting information as provided by the present disclosure, unlicensed spectrum resources may be effectively used to transmit information.

14 Claims, 8 Drawing Sheets

(51) Int. Cl.
  *H04W 74/08* (2009.01)
  *H04W 72/0453* (2023.01)

(56) References Cited

FOREIGN PATENT DOCUMENTS

| CN | 108024310 A | 5/2018 | | |
|---|---|---|---|---|
| EP | 3200380 A4 | 10/2017 | | |
| EP | 3 285 518 A1 | 2/2018 | | |
| WO | WO 2017000415 A1 | 1/2017 | | |
| WO | WO-2017049727 A1 * | 3/2017 | ............ | H04W 16/14 |
| WO | WO 2018036433 A1 | 3/2018 | | |

OTHER PUBLICATIONS

English translation of Written Opinion of International Search Authority in International Application No. PCT/CN2018/093857, dated Mar. 27, 2019.

Examination Report for Indian Application No. 202147003186, dated Jan. 6, 2022.

3GPP TSG RAN WG1 Meeting #93 R1-1806105, Busan, Korea, May 21-25, 2018, Agenda item: 7.6.2, Source: Nokia, Nokia Shanghai Bell, Title: Frame structure for NR-U operation, Document for: Discussion and Decision, 6 pages.

3GPP TSG RAN WG1 Meeting #92bis R1-1805011, Sanya, China, Apr. 16-20, 2018, Source: Ericsson, Title: Physical layer procedures for NR unlicensed operation, Agenda Item: 7.6.4, Document for: Discussion and Decision, 5 pages.

3GPP TSG RAN WG1 Meeting #92 R1-1802363, Athens, Greece, Feb. 26-Mar. 2, 2018, Agenda Item: 6.2.2.3.3, Source: Intel Corporation, Title: Remaining details for Channel Access Mechanism for Autonomous UL Transmission, Document for: Discussion/Decision, 6 pages.

Extended European Search Report in the European Application No. 18925034.3, dated Jan. 21, 2022.

* cited by examiner

METHOD AND APPARATUS FOR TRANSMITTING INFORMATION, BASE STATION, AND USER EQUIPMENT

CROSS REFERENCE TO RELATED APPLICATIONS

This application is a national phase application based on International Application No. PCT/CN2018/093857, filed Jun. 29, 2018, the content of which is incorporated herein by reference.

TECHNICAL FIELD

The present disclosure generally relates to the technical field of communication, and more particularly, to an information transmission method and device, a base station and user equipment (UE).

BACKGROUND

The development of new-generation novel Internet applications such as Augmented Reality (AR)/Virtual Reality (VR) and vehicle-to-vehicle communication makes higher requirements on wireless communication technologies and urges the wireless communication technologies to be constantly evolved to meet the requirements of the applications. At present, a cellular mobile communication technology is in an evolution stage of a new-generation technology. An important characteristic of the new-generation technology is to support flexible configuration of multiple service types. Different service types have different requirements on a wireless communication technology. For example, a main requirement of an enhanced Mobile Broad Band (eMBB) service type focuses on the aspects of large bandwidth, high rate and the like, a main requirement of an Ultra Reliable Low Latency Communication (URLLC) service type focuses on the aspects of relatively high reliability and low delay, and a main requirement of a massive Machine Type Communication (mMTC) service type focuses on the aspect of large connection number. Therefore, a new-generation wireless communication system requires a flexible and configurable design to support transmission of multiple service types.

Under the development of service requirements, only using a licensed spectrum may not meet increasing service requirements, so deployment of a mobile network on an unlicensed spectrum is considered. There may be another system such as a Wireless Fidelity (WiFi) system on the unlicensed spectrum such as 2.4 GHz spectrum and 5 GHz spectrum. How to ensure fair resource sharing of different communication systems on an unlicensed spectrum needs to be researched.

SUMMARY

For solving the problem in the related art, embodiments of the present disclosure provide an information transmission method and device, a base station and UE, which may improve flexibility in configuration of a data transmission starting position on an unlicensed spectrum, thereby improving an effective utilization rate of a resource of an unlicensed spectrum.

According to a first aspect of the embodiments of the present disclosure, an information transmission method is provided, which may be applied to a base station and include that:

transmission configuration information of an unlicensed spectrum is determined, the transmission configuration information being used to indicate each data transmission starting position in a preset time window;

the transmission configuration information is sent to UE; and information transmission with the UE is performed by use of a channel of the unlicensed spectrum according to the transmission configuration information.

In an embodiment, the operation that the transmission configuration information of the unlicensed spectrum is determined may include that:

a channel condition of the unlicensed spectrum is monitored; and the transmission configuration information of the unlicensed spectrum is determined according to the channel condition of the unlicensed spectrum.

In an embodiment, the operation that the transmission configuration information of the unlicensed spectrum is determined may include that:

a number of data transmission starting positions in the preset time window is determined;

each data transmission starting position is configured in the preset time window according to the number of the data transmission starting positions to obtain configuration information; and the transmission configuration information of the unlicensed spectrum is determined according to the configuration information of the data transmission starting positions in the preset time window.

In an embodiment, the operation that the transmission configuration information of the unlicensed spectrum is determined may include that:

a preset transmission configuration list is queried according to preset reference information to determine target configuration information of the data transmission starting positions, a preset position configuration list including a correspondence between preset reference information and configuration information of preset data transmission starting positions; and the transmission configuration information of the unlicensed spectrum is determined according to the target configuration information.

In an embodiment, the operation that the transmission configuration information of the unlicensed spectrum is determined according to the target configuration information may include that:

a preset index list is queried according to the target configuration information to determine a target index corresponding to the target configuration information, the preset index list including a correspondence between a preset index and the configuration information of the preset data transmission starting positions; and the transmission configuration information of the unlicensed spectrum is generated according to the target index.

In an embodiment, the operation that the transmission configuration information is sent to the UE may include that:

the transmission configuration information is loaded in target resource bits of preset signaling; and the transmission configuration information is sent to the UE through the preset signaling, wherein the preset signaling may include any one of: Radio Resource Control (RRC) signaling, Medium Access Control (MAC) Control Element (CE) signaling and physical-layer downlink control signaling.

In an embodiment, the operation that the transmission configuration information is sent to the UE may include that:

a preset signal used for identifying the data transmission starting positions on the unlicensed spectrum is configured in a target time-frequency resource according to the transmission configuration information; and the transmission configuration information is sent to the UE through the target time-frequency resource bearing the preset signal.

In an embodiment, the operation that the information transmission with the UE is performed by use of the channel of the unlicensed spectrum according to the transmission configuration information may include that:

responsive to that an idle channel resource of the unlicensed spectrum is detected, downlink data is sent to the UE according to the transmission configuration information.

According to a second aspect of the embodiments of the present disclosure, an information transmission method is provided, which may be applied to UE and include that:

position reference information is acquired, the position reference information being used to determine a data transmission starting position on an unlicensed spectrum;

the data transmission starting position on the unlicensed spectrum is determined according to the position reference information; and information transmission with a base station is performed by use of a channel of the unlicensed spectrum according to the data transmission starting position.

In an embodiment, the operation that the position reference information is acquired may include that:

transmission configuration information sent by the base station for the unlicensed spectrum is acquired, the transmission configuration information being used to indicate each data transmission starting position in a preset time window; and the operation that the data transmission starting position on the unlicensed spectrum is determined according to the position reference information may include that:

the data transmission starting position on the unlicensed spectrum is determined according to the transmission configuration information.

In an embodiment, the transmission configuration information may include indication information of each data transmission starting position in the preset time window.

In an embodiment, the transmission configuration information may include a target index; and the operation that the data transmission starting position on the unlicensed spectrum is determined according to the transmission configuration information may include that:

a preset index list is queried according to the target index to determine target configuration information, corresponding to the target index, of the data transmission starting positions, the preset index list including a correspondence between a preset index and configuration information of data transmission starting positions.

In an embodiment, the operation that the position reference information is acquired may include that:

a preset signal used for identifying the data transmission starting position on the unlicensed spectrum is detected; and the data transmission starting position on the unlicensed spectrum is determined according to a preset transmission position configuration rule and position information of the preset signal.

In an embodiment, the operation that the information transmission with the base station is performed by use of the channel of the unlicensed spectrum according to the data transmission starting position may include that:

downlink data sent by the base station is acquired through the channel of the unlicensed spectrum according to the data transmission starting position; and/or, uplink data is transmitted to the base station through the channel of the unlicensed spectrum according to the data transmission starting position.

According to a third aspect of the embodiments of the present disclosure, an information transmission device is provided, which may be arranged in a base station and include:

a configuration information determination module, configured to determine transmission configuration information of an unlicensed spectrum, the transmission configuration information being used to indicate each data transmission starting position in a preset time window;

a configuration information sending module, configured to send the transmission configuration information to UE; and a transmission module, configured to perform information transmission with the UE by use of a channel of the unlicensed spectrum according to the transmission configuration information.

In an embodiment, the configuration information determination module may include:

a channel monitoring submodule, configured to monitor a channel condition of the unlicensed spectrum; and an information determination submodule, configured to determine the transmission configuration information of the unlicensed spectrum according to the channel condition of the unlicensed spectrum.

In an embodiment, the configuration information determination module may include:

a number determination submodule, configured to determine a number of data transmission starting positions in the preset time window;

a configuration submodule, configured to configure each data transmission starting position in the preset time window according to the number of the data transmission starting positions to obtain configuration information; and a first configuration information determination submodule, configured to determine the transmission configuration information of the unlicensed spectrum according to the configuration information of the data transmission starting positions in the preset time window.

In an embodiment, the configuration information determination module may include:

a query submodule, configured to query a preset transmission configuration list according to preset reference information to determine target configuration information of the data transmission starting positions, a preset position configuration list including a correspondence between preset reference information and configuration information of preset data transmission starting positions; and a second configuration information determination submodule, configured to determine the transmission configuration information of the unlicensed spectrum according to the target configuration information.

In an embodiment, the second configuration information determination submodule may include:

an index query unit, configured to query a preset index list according to the target configuration information to determine a target index corresponding to the target configuration information, the preset index list including a correspondence between a preset index and the configuration information of the preset data transmission starting positions; and a configuration information determination unit, configured to generate the transmission configuration information of the unlicensed spectrum according to the target index.

In an embodiment, the configuration information sending module may include:

a loading submodule, configured to load the transmission configuration information in target resource bits of preset signaling; and a first sending submodule, configured to send the transmission configuration information to the UE through the preset signaling, wherein the preset signaling may include any one of:

RRC signaling, MAC CE signaling and physical-layer downlink control signaling.

In an embodiment, the configuration information sending module may include:

a signal setting submodule, configured to configure a preset signal used for identifying the data transmission starting positions on the unlicensed spectrum in a target time-frequency resource according to the transmission configuration information; and a second sending submodule, configured to send the transmission configuration information to the UE through the target time-frequency resource bearing the preset signal.

In an embodiment, the transmission module may be configured to, responsive to that an idle channel resource of the unlicensed spectrum is detected, send downlink data to the UE according to the transmission configuration information.

According to a fourth aspect of the embodiments of the present disclosure, an information transmission device is provided, which may be arranged in UE and include:

an information acquisition module, configured to acquire position reference information, the position reference information being used to determine a data transmission starting position on an unlicensed spectrum;

a position determination module, configured to determine the data transmission starting position on the unlicensed spectrum according to the position reference information; and a transmission module, configured to perform information transmission with a base station by use of a channel of the unlicensed spectrum according to the data transmission starting position.

In an embodiment, the information acquisition module may be configured to acquire transmission configuration information transmitted by the base station for the unlicensed spectrum, the transmission configuration information being used to indicate each data transmission starting position in a preset time window; and the position determination module may be configured to determine the data transmission starting position on the unlicensed spectrum according to the transmission configuration information.

In an embodiment, the transmission configuration information may include indication information of each data transmission starting position in the preset time window.

In an embodiment, the transmission configuration information may include a target index; and the position determination module may be configured to query a preset index list according to the target index to determine target configuration information, corresponding to the target index, of the data transmission starting positions, the preset index list including a correspondence between a preset index and configuration information of data transmission starting positions.

In an embodiment, the information acquisition module may be configured to detect a preset signal used for identifying the data transmission starting position on the unlicensed spectrum; and the position determination module may be configured to determine the data transmission starting position on the unlicensed spectrum according to a preset transmission position configuration rule and position information of the preset signal.

In an embodiment, the transmission module may include at least one of the following submodules:

a downlink transmission submodule, configured to acquire downlink data sent by the base station through the channel of the unlicensed spectrum according to the data transmission starting position; or an uplink transmission submodule, configured to transmit uplink data to the base station through the channel of the unlicensed spectrum according to the data transmission starting position.

According to a fifth aspect of the embodiments of the present disclosure, a non-transitory computer-readable storage medium is provided, in which a computer instruction may be stored. The instruction may be executed by a processor to implement the operations of any method as described in the first aspect.

According to a sixth aspect of the embodiments of the present disclosure, a non-transitory computer-readable storage medium is provided, in which a computer instruction may be stored. The instruction may be executed by a processor to implement the operations of any method as described in the second aspect.

According to a seventh aspect of the embodiments of the present disclosure, a base station is provided, which may include:

a processor; and a memory configured to store an instruction executable by the processor, wherein the processor may be configured to:

determine transmission configuration information of an unlicensed spectrum, the transmission configuration information being used to indicate each data transmission starting position in a preset time window;

send the transmission configuration information to UE; and perform information transmission with the UE by use of a channel of the unlicensed spectrum according to the transmission configuration information.

According to an eighth aspect of the embodiments of the present disclosure, UE is provided, which may include:

a processor; and a memory configured to store an instruction executable by the processor, wherein the processor may be configured to:

acquire position reference information, the position reference information being used to determine a data transmission starting position on an unlicensed spectrum;

determine the data transmission starting position on the unlicensed spectrum according to the position reference information; and perform information transmission with a base station by use of a channel of the unlicensed spectrum according to the data transmission starting position.

The technical solutions provided in the embodiments of the present disclosure may have the following beneficial effects.

In the embodiments of the present disclosure, the base station may flexibly configure the data transmission starting positions in the preset time window, generate the transmission configuration information of the unlicensed spectrum according to the determined target configuration information of the data transmission starting positions and send it to the UE, and then the UE may perform information transmission with the base station based on the transmission configuration information of the unlicensed spectrum, to ensure that the channel of the unlicensed spectrum may be flexibly accessed for information transmission after an information sender detects the idle channel resource of the unlicensed spectrum, thereby improving a utilization rate of the idle resource of the unlicensed spectrum and further improving the data transmission efficiency.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 4-1 is a schematic diagram illustrating an information transmission scenario according to an exemplary embodiment of the present disclosure.

FIG. 4-2 is a schematic diagram illustrating another information transmission scenario according to an exemplary embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Execution subjects involved in the present disclosure include a base station and UE. The base station may be a base station, sub base station and the like with a massive antenna array. The UE may be a user terminal, a user node, a mobile terminal, a tablet computer or the like. In a specific implementation process, the base station and the UE are independent respectively, and also communicate with each other to implement the technical solutions provided in the present disclosure together.

The present disclosure provides an information transmission method, to enable a system device through data transmission starting positions, configured by a base station, on an unlicensed spectrum to timely transmit information by use of resources of the unlicensed spectrum after detecting an idle channel resource of the unlicensed spectrum, thereby effectively utilizing the resources of the unlicensed spectrum and improving the information transmission efficiency.

Figure 1:
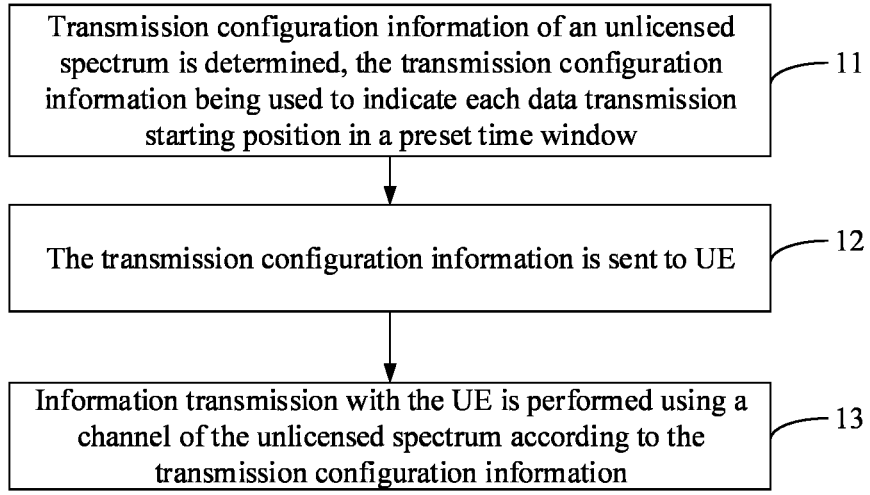
FIG. 1 is a flow chart showing an information transmission method according to an exemplary embodiment of the present disclosure.

FIG. 1 is a flow chart showing an information transmission method according to an exemplary embodiment. The method is applied to a base station of a 5th-Generation (5G) New Radio (NR) network, and may include the following operations.

In 11, transmission configuration information of an unlicensed spectrum is determined, the transmission configuration information being used to indicate each data transmission starting position in a preset time window.

In the related art, a data transmission starting position, for example, symbol 0 or symbol 7 of a subframe, on an unlicensed spectrum in a License Assisted Access (LAA) mechanism is specified in a 4th-Generation (4G) Long Term Evolution (LTE) system protocol. That is, in the related art, when an information sender detects an idle channel resource of the unlicensed spectrum, information transmission is performed through the unlicensed spectrum according to the data transmission starting position specified in the system protocol.

Unlike the related art, in the present disclosure, the base station may flexibly configure the data transmission starting positions on the unlicensed spectrum in the preset time window according to a preset rule. The preset time window may include one or more transmission units. In an 5G NR system, the transmission unit may be a subframe, a slot, a mini-slot, an Orthogonal Frequency Division Multiplexing (OFDM) symbol and the like.

In the present disclosure, the base station may determine specific transmission configuration information of the unlicensed spectrum according to device information of all UE or UE of a preset type that presently accesses the network, or, the base station determines corresponding transmission configuration information of the unlicensed spectrum for a UE that accesses the network.

That is, the transmission configuration information, determined by the base station, of the unlicensed spectrum may be applied to all UE or UE of a part of types that accesses the cell network, and may also be dedicated to specified UE.

In an embodiment of the present disclosure, the base station may determine the transmission configuration information of the unlicensed spectrum with reference to a channel condition of the unlicensed spectrum.

Figure 2:
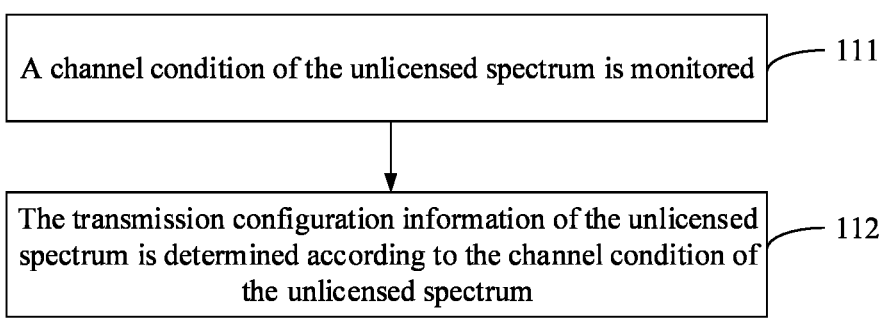
FIG. 2 is a flow chart showing another information transmission method according to an exemplary embodiment of the present disclosure.

Referring to a flow chart showing another information transmission method according to an exemplary embodiment in FIG. 2, the operation in 11 may include the following steps.

In 111, a channel condition of the unlicensed spectrum is monitored.

The unlicensed spectrum such as 2.4 GHz spectrum and 5 GHz spectrum is available for various technologies such as Bluetooth (BT) and WiFi technologies, and consequently, an interference environment is usually complex. In the present disclosure, the base station, after detecting an idle channel resource of the unlicensed spectrum, may monitor channel quality information of the unlicensed spectrum by use of a related technology, to subsequently determine how to configure the data transmission starting positions according to the channel condition of the unlicensed spectrum.

For monitoring the channel condition of the unlicensed spectrum, for example, the base station may acquire channel quality information of a downlink channel of the unlicensed spectrum through reciprocity of uplink and downlink channels according to a measurement result of an uplink Sounding Reference Signal (SRS).

Or, the base station sends a downlink reference signal to a UE or multiple or all UE within a signal coverage in the unlicensed spectrum. Each UE measures the downlink reference signal and feeds back a measurement result to the base station, to enable the base station to determine the channel quality information of the unlicensed spectrum according to the measurement result of the downlink reference signal.

In 112, the transmission configuration information of the unlicensed spectrum is determined according to the channel condition of the unlicensed spectrum.

In an embodiment of the present disclosure, the base station may determine a resource utilization condition of the unlicensed spectrum according to the channel quality information. When the channel of the unlicensed spectrum is relatively idle, the base station may configure fewer data transmission starting positions in the preset time window.

Conversely, when the channel resource of the unlicensed spectrum is insufficient, the base station may configure more data transmission starting positions in the preset time window.

In another embodiment of the present disclosure, the base station may also configure the data transmission starting positions with reference to a frequency range of the idle channel of the unlicensed spectrum.

A specific implementation process is as follows: the base station may determine a subcarrier spacing supported on a corresponding working carrier according to the frequency range, for example, 5,900 MHz to 5,950 MHz, of the idle channel of the unlicensed spectrum. The subcarrier spacing is a difference between center frequencies of two adjacent subcarriers.

According to related knowledge, for an OFDM-based system, a size of the subcarrier spacing is inversely proportional to a time length of an OFDM symbol, namely if the subcarrier spacing is larger, the time length of the corresponding OFDM symbol is smaller. Correspondingly, more data transmission starting positions on the unlicensed spectrum may be configured within a preset time window.

Therefore, the base station may configure the data transmission starting positions according to the following principle: the number of the data transmission starting positions configured in the preset time window is directly proportional to the subcarrier spacing.

That is, when the base station supports a relatively large subcarrier spacing on the corresponding working carrier, more data transmission starting positions may be configured in the preset time window.

Conversely, when the base station supports a relatively small subcarrier spacing on the corresponding working carrier, fewer data transmission starting positions may be configured in the preset time window to improve the flexibility in access by the information sender to the channel of the unlicensed spectrum. The information sender may be the base station, and may also be UE.

In the present disclosure, the base station may determine the transmission configuration information by use of the following at least two modes.

A first implementation mode: the base station independently determines the number of data transmission starting positions required to be set in the preset time window and a position of each data transmission starting position in the preset time window according to a preset rule, thereby determining the transmission configuration information.

Figure 3:
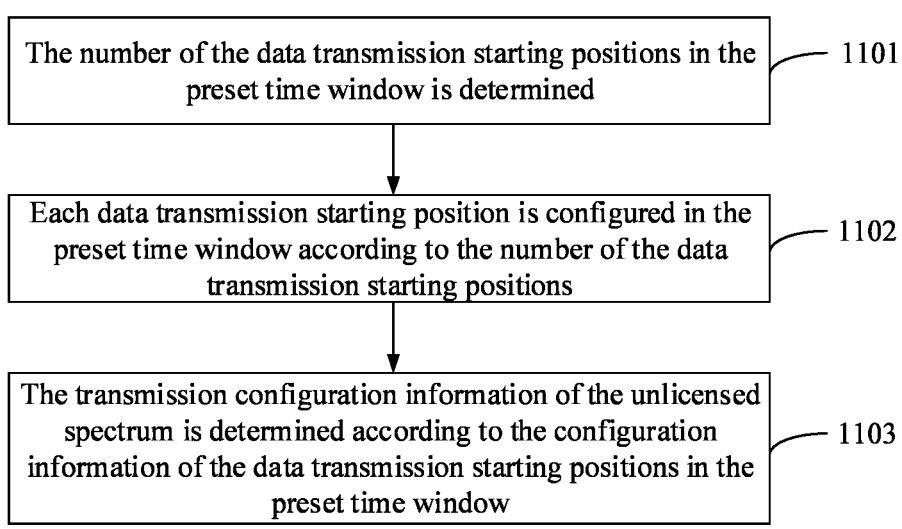
FIG. 3 is a flow chart showing another information transmission method according to an exemplary embodiment of the present disclosure.

Referring to a flow chart showing another information transmission method according to an exemplary embodiment in FIG. 3, the operation in 11 may include the following steps.

In 1101, the number of the data transmission starting positions in the preset time window is determined.

In the present disclosure, the base station may independently determine the number of data transmission starting positions required to be set in a preset time window on the unlicensed spectrum according to different application scenarios. For example, the base station may configure more data transmission starting positions in the preset time window according to a flexibility requirement of the system.

If the number of the data transmission starting positions is represented by N, in the present disclosure, N may be a positive integer more than or equal to 2. For example, the preset time window is a subframe, and the subframe includes 14 symbols. In such case, N may be any integer more than or equal to 2 and less than or equal to 14.

In 1102, each data transmission starting position is configured in the preset time window according to the number of the data transmission starting positions.

Figures 1, 4:
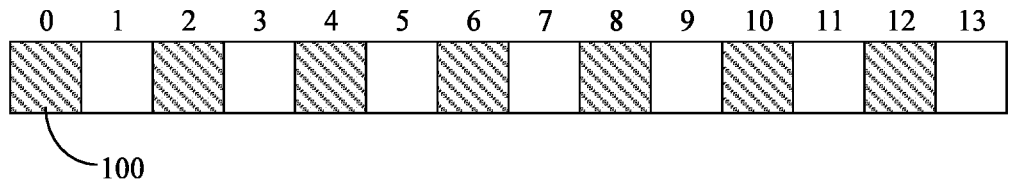
Figures 2, 4:
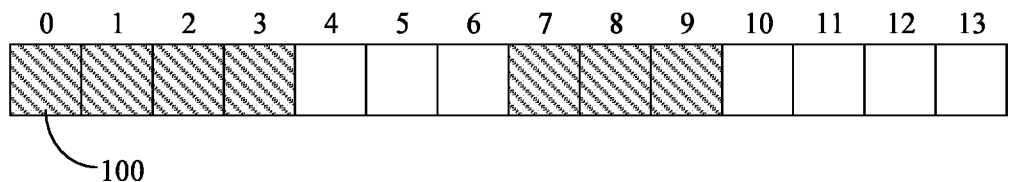

For example, the preset time window is a subframe. If the number, determined in 1101, of the data transmission starting positions is 7, the base station may configure each data transmission starting position in the preset time window according to a preset rule. Exemplarily, the base station may set symbols 0, 2, 4, 6, 8, 10 and 12 of the subframe as possible data transmission starting positions 100 according to a uniform distribution principle respectively, as shown in FIG. 4-1.

In another embodiment of the present disclosure, the base station may also configure each data transmission starting position on the unlicensed spectrum in the preset time window with reference to another factor. As shown in FIG. 4-2, the base station may set symbols 0, 1, 2, 3, 7, 8 and 9 as the data transmission starting positions 100 on the unlicensed spectrum respectively, namely first four symbols in a first slot and first three symbols in a second slot are configured as the data transmission starting positions on the unlicensed spectrum.

In 1103, the transmission configuration information of the unlicensed spectrum is determined according to the configuration information of the data transmission starting positions in the preset time window.

The transmission configuration information is generated according to a specific configuration of the data transmission starting positions on the unlicensed spectrum by the base station in the preset time window, to indicate specific positions where the UE may transmit information through the resource of the unlicensed spectrum in the preset time window.

Corresponding to FIG. 4-1, the transmission configuration information, determined by the base station, of the unlicensed spectrum is {0, 2, 4, 6, 8, 10, 12}. Similarly, corresponding to FIG. 4-2, the transmission configuration information, determined by the base station, of the unlicensed spectrum is {0, 1, 2, 3, 7, 8, 9}.

A second implementation mode: the base station determines the transmission configuration information according to a preset transmission configuration list.

Figure 5:
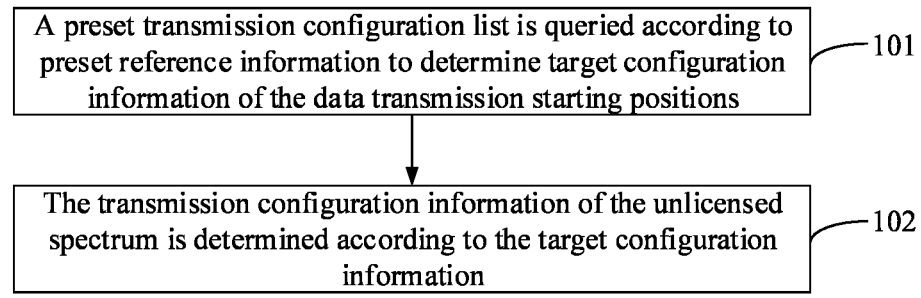
FIG. 5 is a flow chart showing another information transmission method according to an exemplary embodiment of the present disclosure.

Referring to a flow chart showing another information transmission method according to an exemplary embodiment in FIG. 5, the operation in 11 may include the following steps.

In 101, a preset transmission configuration list is queried according to preset reference information to determine target configuration information of the data transmission starting positions.

In the present disclosure, the system may specify some preset types of configuration information for the transmission starting positions on the unlicensed spectrum. The base station may determine to use one piece of configuration information according to requirements of different application scenarios. The preset reference information is a reference for the base station to determine the target configuration information according to a practical application scenario, and may include at least one of the following information: device information such as a device type of the UE, the channel condition of the unlicensed spectrum, the subcarrier spacing supported by the base station on the unlicensed spectrum or other information.

The base station may query the preset transmission configuration list according to the preset reference information to determine the target configuration information of the data transmission starting positions. The preset transmission configuration information list includes a correspondence between preset reference information and configuration information of preset data transmission starting positions.

There is made such a hypothesis that the preset transmission configuration list includes three pieces of configuration information, exemplarily, as shown in Table 1.

TABLE 1

| Reference information | Data transmission starting position |
| --- | --- |
| Reference information A | {0, 7} |
| Reference information B | {0, 4, 8, 12} |
| Reference information C | {0, 2, 4, 6, 8, 10, 12} |

In the embodiment of the present disclosure, the base station may select one configuration information of the data transmission positions from Table 1 as the target configuration information, such as {0, 2, 4, 6, 8, 10, 12}, according to the preset reference information. In an embodiment of the present disclosure, the base station may determine the transmission configuration information of the unlicensed spectrum according to the channel condition of the unlicensed spectrum after the idle channel of the unlicensed spectrum is detected.

In an embodiment, there is made such a hypothesis that the preset reference information includes channel quality information of the idle channel of the unlicensed spectrum. The channel quality information of the idle channel of the unlicensed spectrum is configured to represent the channel condition of the unlicensed spectrum, and for example, may be a Channel Quality Indication (CQI) and other information.

For example, the preset reference information is a CQI level of the channel of the unlicensed spectrum. In such case, the preset transmission configuration list may include a correspondence between a CQI and configuration information of data transmission starting positions, exemplarily, as shown in Table 2.

TABLE 2

| CQI level | Data transmission starting position |
| --- | --- |
| 10~15 | {0, 7} |
| 5~9 | {0, 4, 8, 12} |
| 0~4 | {0, 2, 4, 6, 8, 10, 12} |

According to related knowledge, a CQI level with a high value represents that the channel has good channel quality, and conversely, a CQI level with a low value represents relatively poor channel quality.

The base station, after determining the CQI level, such as 6, of the channel of the unlicensed spectrum, may query Table 2 to determine the target configuration information of the data transmission starting positions, i.e., {0, 4, 8, 12}.

In another embodiment of the present disclosure, if the preset reference information includes the subcarrier spacing supported by the base station on the unlicensed working carrier, the preset transmission configuration list may include a correspondence between a subcarrier spacing and configuration information of data transmission starting positions, exemplarily, as shown in Table 3.

TABLE 3

| Subcarrier spacing | Data transmission starting position |
| --- | --- |
| 120 kHz | {0, 7} |
| 60 kHz | {0, 4, 8, 12} |
| 15 kHz | {0, 2, 4, 6, 8, 10, 12} |

If the subcarrier spacing supported by the base station on the unlicensed spectrum is 60 KHz, it is obtained by querying Table 3 that the corresponding target configuration information is {0, 4, 8, 12}.

In 102, the transmission configuration information of the unlicensed spectrum is determined according to the target configuration information.

In an embodiment of the present disclosure, the base station may directly determine the target configuration information as the transmission configuration information to be sent to the UE.

That is, the transmission configuration information directly includes the configuration information of the data transmission starting positions in the preset time window, such as {0, 4, 8, 12}.

Figure 6:
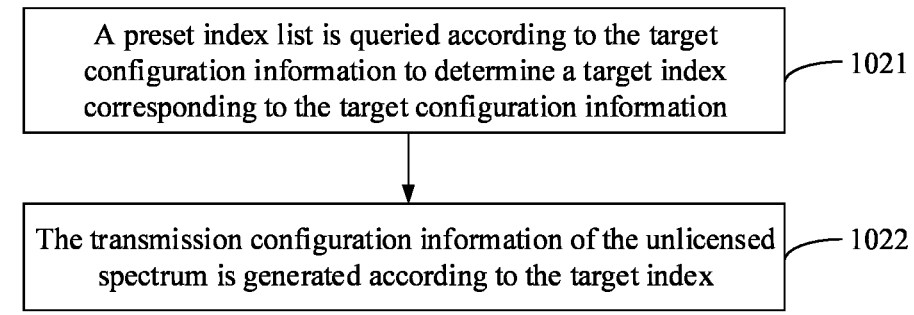
FIG. 6 is a flow chart showing another information transmission method according to an exemplary embodiment of the present disclosure.

In another embodiment of the present disclosure, referring to a flow chart showing another information transmission method according to an exemplary embodiment in FIG. 6, the operation in 102 may include the following steps.

In 1021, a preset index list is queried according to the target configuration information to determine a target index corresponding to the target configuration information, the preset index list including a correspondence between a preset index and configuration information of data transmission starting positions.

In an embodiment of the present disclosure, for the condition that the system predetermines the preset transmission configuration list, the system may also predetermine the preset index list. The preset index list includes the correspondence between the preset index and configuration information of the preset data transmission starting positions, exemplarily, as shown in Table 4.

TABLE 4

| Index | Data transmission starting position |
|-------|-------------------------------------|
| 1     | {0, 7}                              |
| 2     | {0, 4, 8, 12}                       |
| 3     | {0, 2, 4, 6, 8, 10, 12}             |

If the target configuration information, determined by the base station, of the data transmission starting positions is {0, 4, 8, 12}, the corresponding target index is determined to be 2 according to Table 4.

In 1022, the transmission configuration information of the unlicensed spectrum is generated according to the target index.

The transmission configuration information of the unlicensed spectrum may only include the target index.

Correspondingly, the UE side also presets the preset index list, and after detecting the target index, may determine the corresponding configuration information of the data transmission starting positions according to the target index.

In 12, the transmission configuration information is sent to UE.

In the present disclosure, the base station may send the transmission configuration information of the unlicensed spectrum to the UE through RRC signaling, MAC CE signaling, physical-layer downlink control signaling and the like, such that the UE may receive downlink information sent by the base station or transmit uplink information through the channel of the unlicensed spectrum based on the transmission configuration information.

In the present disclosure, the base station may send the transmission configuration information to the UE through the resource of the unlicensed spectrum, and may also send the transmission configuration information to the UE through the resource of the unlicensed spectrum after accessing the channel of the unlicensed spectrum.

In an embodiment, the transmission configuration information includes the target configuration information of the data transmission starting positions on the unlicensed spectrum or the target index corresponding to the target configuration.

Figure 7:
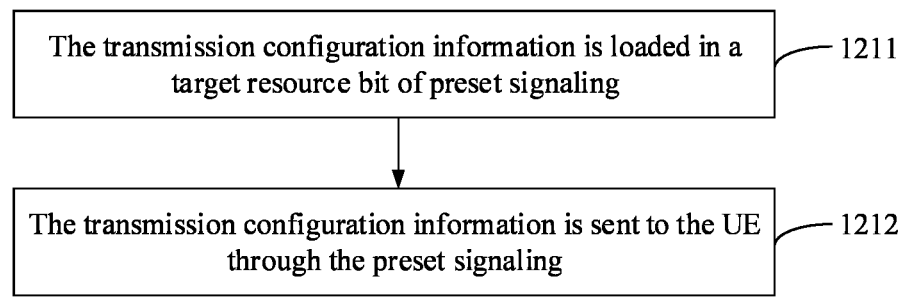
FIG. 7 is a flow chart showing another information transmission method according to an exemplary embodiment of the present disclosure.

Referring to a flow chart showing another information transmission method according to an exemplary embodiment in FIG. 7, the operation in 12 may include the following steps.

In 1211, the transmission configuration information is loaded in target resource bits of preset signaling.

In the present disclosure, the system may predetermine to adopt a preset number of bits to bear the transmission configuration information of the unlicensed spectrum in the preset signaling.

For example, the transmission configuration information includes the target index. In such case, the number of the target resource bit is related to the number of table entries of the preset index list. For example, if the preset index list includes three table entries, two bits may be adopted to bear the transmission configuration information; and similarly, if the preset index list includes seven table entries, three bits may be adopted to bear the transmission configuration information. That is, the number n of the target resource bit should meet that $(2_n-1)$ is more than or equal to the number of the table entries of the preset index list.

Exemplarily, corresponding to Table 4, the base station may adopt two bits of the preset signaling to bear the transmission configuration information. If the target index is 1, the two bits are set to be 01.

In an embodiment of the present disclosure, a configuration position of the target resource bit in the preset signaling may be predetermined by the system to be, for example, bit 9 and bit 10. In the example, the base station may load the target index in the bit 9 and bit 10 of the preset signaling.

In another embodiment of the present disclosure, the configuration position of the target resource bit in the preset signaling may also be dynamically configured by the base station. In such case, the base station may send indication information of the target resource bit to the UE in advance, to enable the UE to determine a specific resource where the transmission configuration information of the unlicensed spectrum may be parsed in the preset signaling.

It is to be noted that, in an embodiment, the indication information of the target resource bit and the transmission configuration information may be loaded in the same signaling, and moreover, in a time domain, a resource bit for bearing the indication information of the target resource bit is before the resource bit for bearing the transmission configuration information, such that the UE, during information parsing, may obtain the indication information of the target resource bit by parsing at first and then parse the transmission configuration information from the target resource bit indicated by the indication information.

In 1212, the transmission configuration information is sent to the UE through the preset signaling. The preset signaling includes any one of:

RRC signaling, MAC CE signaling and physical-layer downlink control signaling.

Figure 8:
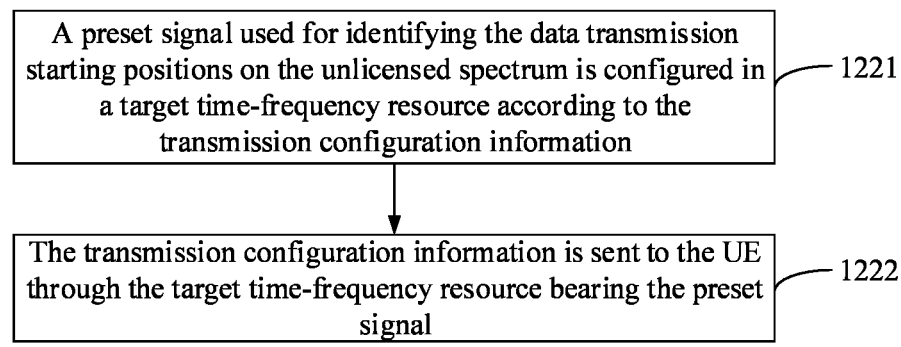
FIG. 8 is a flow chart showing another information transmission method according to an exemplary embodiment of the present disclosure.

Referring to a flow chart showing another information transmission method according to an exemplary embodiment in FIG. 8, the operation in 12 may include the following steps.

In 1221, a preset signal used for identifying the data transmission starting positions on the unlicensed spectrum is configured in a target time-frequency resource according to the transmission configuration information.

In the embodiment of the present disclosure, the base station, after determining the configuration information of the transmission starting positions on the unlicensed spectrum, may also notify it to the UE implicitly. For example, the preset signal used for identifying the data transmission starting positions on the unlicensed spectrum, for example, a pilot signal, is configured in the target time-frequency resource. Exemplarily, when the configuration information, determined by the base station, of the data transmission starting positions on the unlicensed spectrum is (0, 4, 8, 12), referring to a schematic diagram of an information transmission scenario according to an exemplary embodiment in FIG. 9, the base station may configure the preset signal 200 in symbols 0, 4, 8 and 12 of a subframe on the target time-frequency resource to represent the transmission configuration information.

In 1222, the transmission configuration information is sent to the UE through the target time-frequency resource bearing the preset signal.

Figure 9:
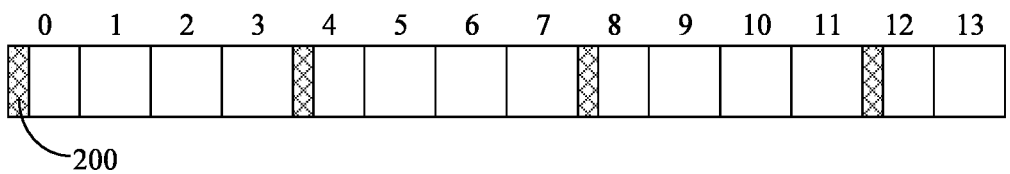
FIG. 9 is a schematic diagram illustrating another information transmission scenario according to an exemplary embodiment of the present disclosure.

In the above example, the base station may implicitly send the transmission configuration information (0, 4, 8, 12) to the UE through the target time-frequency resource with the subframe shown in FIG. 9.

In the embodiment of the present disclosure, the target time-frequency resource may be predetermined by the system and may also be dynamically configured by the base station. When the target time-frequency resource is dynamically configured by the base station, before the operation in 1222, the base station is further required to send configuration information of the target time-frequency resource to the UE, such that the UE determines a time-frequency range of the target time-frequency resource according to the configuration information of the target time-frequency resource and subsequently detects the preset signal in the time-frequency range to parse the transmission configuration information of the unlicensed spectrum.

In 13, information transmission with the UE is performed using a channel of the unlicensed spectrum according to the transmission configuration information.

In the present disclosure, implementation of the operation in 13 may include two conditions.

A first condition: when there is data required to be sent, the base station detects whether the channel of the unlicensed spectrum is idle, and after detecting an idle channel of the unlicensed spectrum, performs information transmission from any starting position through the resource of the unlicensed spectrum according to the target configuration information of the data transmission starting positions. Correspondingly, the UE receives the downlink information sent by the base station in the channel of the unlicensed spectrum according to the transmission configuration information.

A second condition: when there is data required to be sent, the UE may also detect whether the channel of the unlicensed spectrum is idle, and after detecting an idle channel of the unlicensed spectrum, sends the uplink information to the base station by use of the transmission configuration information through the channel of the unlicensed spectrum. The base station, after acquiring information of the idle channel, detected by the UE, of the unlicensed spectrum, may receive the uplink information sent by the UE through the channel of the unlicensed spectrum based on the target configuration information of the data transmission starting positions.

It can be seen that, by using the information transmission method provided in the present disclosure, the base station may flexibly configure the data transmission starting positions in the preset time window according to the preset rule, generate the transmission configuration information of the unlicensed spectrum according to the determined target configuration information of the data transmission starting positions and send it to the UE, and then the UE may perform information transmission with the base station based on the transmission configuration information of the unlicensed spectrum, so that it is ensured that an information sender may flexibly access the channel of the unlicensed spectrum after the idle channel resource of the unlicensed spectrum is detected, channel access opportunities are increased, a utilization rate of idle resources of the unlicensed spectrum is increased, and the data transmission efficiency is further improved.

Correspondingly, the present disclosure also provides an information transmission method, which is applied to UE. Referring to a flow chart showing an information transmission method according to an exemplary embodiment in FIG. 10, the method may include the following operations.

In 21, position reference information is acquired, the position reference information being used to determine a data transmission starting position on an unlicensed spectrum.

In the present disclosure, the position reference information may be transmission configuration information, transmitted by a base station, of the unlicensed spectrum, and may also be a preset signal, for example, a pilot signal, detected by the UE on a fixed time-frequency resource or a preset time-frequency resource, to enable the UE to determine the data transmission starting position on the unlicensed spectrum according to the preset signal.

That is, in 21, the transmission configuration information transmitted by the base station for the unlicensed spectrum may be received, or the preset signal used for identifying the data transmission starting position on the unlicensed spectrum may be detected.

In 22, the data transmission starting position on the unlicensed spectrum is determined according to the position reference information.

According to different position reference information, the UE may determine data transmission starting position information of a channel of the unlicensed spectrum in the following two manners.

A first manner: the data transmission starting position on the unlicensed spectrum is determined according to the transmission configuration information transmitted by the base station.

If the transmission configuration information transmitted by the base station directly includes indication information of a data transmission starting position in a preset time window, the UE may directly determine the data transmission starting position on the unlicensed spectrum.

If the transmission configuration information transmitted by the base station includes a target index representing configuration information of data transmission starting positions, the UE may query a preset index list according to the target index to determine target configuration information of the data transmission position.

The preset index list includes a correspondence between a preset index and configuration information of data transmission starting positions. Exemplarily, the preset index list may be shown in Table 4.

If the target index in the transmission configuration information received by the UE is 2, it is obtained by querying Table 4 that the transmission starting position, configured by the base station, on the unlicensed spectrum is {0, 4, 8, 12}.

A second manner: the UE determines the data transmission starting position on the unlicensed spectrum according to the detected preset signal.

In the embodiment of the present disclosure, in condition that the base station does not detect any idle channel of the unlicensed spectrum, the base station may configure the preset signal on the fixed time-frequency resource or a configurable time-frequency resource to notify the UE of the data transmission starting position for the unlicensed spectrum.

In such case, if the system predetermines to set the preset signal on the fixed time-frequency resource, the UE may detect the preset signal on the fixed time-frequency resource and then determine the data transmission starting position on the unlicensed spectrum according to a position of the preset signal and a preset transmission position configuration rule. The preset transmission position configuration rule may be that the position of the preset signal is the data transmission starting position on the unlicensed spectrum. Exemplarily, referring to a schematic diagram of an information transmission application scenario according to an exemplary embodiment in FIG. 9, the UE detects pilot information 200 at positions of symbols 0, 4, 8 and 12 of a subframe and may determine that the symbols 0, 4, 8 and 12 of the subframe are data transmission starting positions where the channel of the unlicensed spectrum may be accessed.

In another embodiment of the present disclosure, the preset transmission position configuration rule may also be that a preset position after the preset signal is the data transmission starting position on the unlicensed spectrum. For example, a second symbol after the preset signal is determined as the data transmission starting position on the unlicensed spectrum according to the preset rule.

In another embodiment of the present disclosure, the base station may also configure the preset signal on the configurable time-frequency resource to indicate the data transmission starting position on the unlicensed spectrum. In such case, the UE acquires configuration information of a target time-frequency resource and determines a time-frequency range of the target time-frequency resource according to the configuration information at first, and then detects the preset signal in the target time-frequency resource according to the abovementioned manner and determines the data transmission starting position on the unlicensed spectrum according to the preset signal.

In 23, information transmission with a base station is performed using a channel of the unlicensed spectrum according to the data transmission starting position.

Corresponding to the implementation mode of the base station side, implementation of the operation in 23 may also include at least one of the following conditions.

A first condition: the UE may receive downlink information sent by the base station in the channel of the unlicensed spectrum according to the data transmission starting position on the unlicensed spectrum.

A second condition: the UE, after detecting an idle channel of the unlicensed spectrum, accesses the channel of the unlicensed spectrum by use of the data transmission starting position on the unlicensed spectrum and sends uplink information to the base station through the channel of the unlicensed spectrum. Correspondingly, the base station, after acquiring indication information about that the UE has detected the idle channel of the unlicensed spectrum, may receive the uplink information sent by the UE through the channel of the unlicensed spectrum based on the target configuration information of the data transmission starting position.

In the present disclosure, the UE may determine the transmission configuration information of the system for the unlicensed spectrum through the acquired position reference information, i.e., the configuration information of the data transmission starting position in the preset time window, and further detect the information transmitted by the base station through a resource of the unlicensed spectrum according to the data transmission starting position, or, after detecting an idle channel resource of the unlicensed spectrum, send the uplink information to the base station by use of the transmission configuration information. Through the flexibly configured data transmission starting position, the probability of transmitting the information through resources of the unlicensed spectrum may be increased, a utilization rate of idle resources of the unlicensed spectrum may be increased, and the data transmission efficiency is further improved.

For simple description, each of the abovementioned method embodiments is expressed as a combination of a series of operations, but those skilled in the art should know that the present disclosure is not limited to the described operation sequence because some steps or operations may be executed in other sequences or at the same time according to the present disclosure.

Second, those skilled in the art should also know that all the embodiments described in the specification are optional embodiments and involved operations and modules are not always required by the present disclosure.

Corresponding to the abovementioned application function realization method embodiments, the present disclosure also provides embodiments of an application function realization device and a corresponding terminal.

Correspondingly, the present disclosure provides an information transmission device, which may be arranged in a base station.

Figure 11:
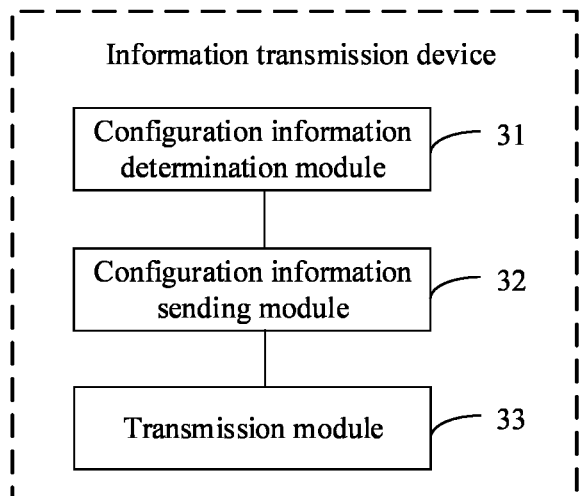
FIG. 11 is a block diagram of an information transmission device according to an exemplary embodiment of the present disclosure.

Referring to a block diagram of an information transmission device according to an exemplary embodiment in FIG. 11, the device may include:

a configuration information determination module 31, configured to determine transmission configuration information of an unlicensed spectrum, the transmission configuration information being configured to indicate each data transmission starting position in a preset time window;

a configuration information sending module 32, configured to send the transmission configuration information to UE; and a transmission module 33, configured to perform information transmission with the UE using a channel of the unlicensed spectrum according to the transmission configuration information.

In another device embodiment of the present disclosure, the transmission module 33 may be configured to, responsive to that an idle channel resource of the unlicensed spectrum is detected, send downlink data to the UE according to the transmission configuration information.

Figure 12:
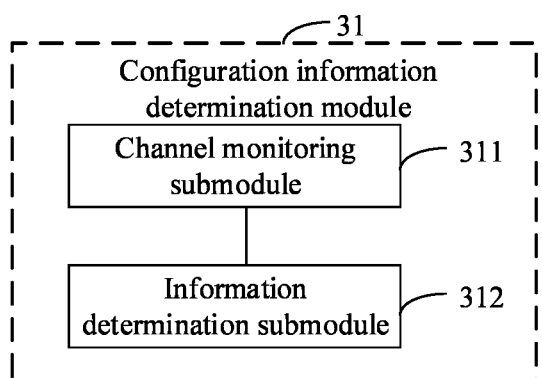
FIG. 12 is a block diagram of another information transmission device according to an exemplary embodiment of the present disclosure.

Referring to a block diagram of another information transmission device according to an exemplary embodiment, in FIG. 12, based on the device embodiment shown in FIG. 11, the configuration information determination module 31 may include:

a channel monitoring submodule 311, configured to monitor a channel condition of the unlicensed spectrum; and an information determination submodule 312, configured to determine the transmission configuration information of the unlicensed spectrum according to the channel condition of the unlicensed spectrum.

Figure 13:
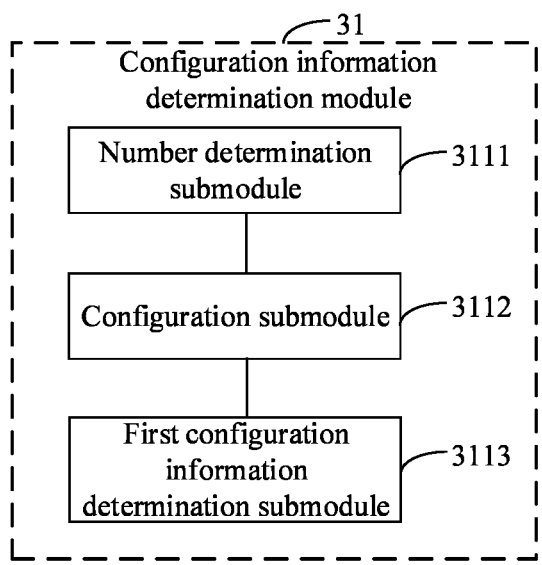
FIG. 13 is a block diagram of another information transmission device according to an exemplary embodiment of the present disclosure.

Referring to a block diagram of another information transmission device according to an exemplary embodiment in FIG. 13, based on the device embodiment shown in FIG. 11, the configuration information determination module 31 may include:

a number determination submodule 3111, configured to determine the number of the data transmission starting positions in the preset time window;

a configuration submodule 3112, configured to configure each data transmission starting position in the preset time window according to the number of the data transmission starting positions to obtain configuration information; and a first configuration information determination submodule 3113, configured to determine the transmission configuration information of the unlicensed spectrum according to the configuration information of the data transmission starting positions in the preset time window.

In another information transmission device embodiment of the present disclosure, the information determination submodule 312 may also include the number determination submodule 3111, the configuration submodule 3112 and the first configuration information determination submodule 3113.

Figure 14:
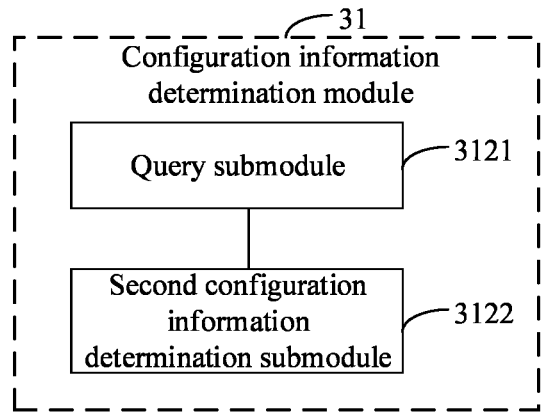
FIG. 14 is a block diagram of another information transmission device according to an exemplary embodiment of the present disclosure.

Referring to a block diagram of another information transmission device according to an exemplary embodiment in FIG. 14, based on the device embodiment shown in FIG. 11, the configuration information determination module 31 may include:

a query submodule 3121, configured to query a preset transmission configuration list according to preset reference information to determine target configuration information of the data transmission starting positions, the preset position configuration list including a correspondence between preset reference information and configuration information of preset data transmission starting positions; and a second configuration information determination submodule 3122, configured to determine the transmission configuration information of the unlicensed spectrum according to the target configuration information.

In another information transmission device embodiment of the present disclosure, the information determination submodule 312 may also include the query submodule 3121 and the second configuration information determination submodule 3122.

Figure 15:
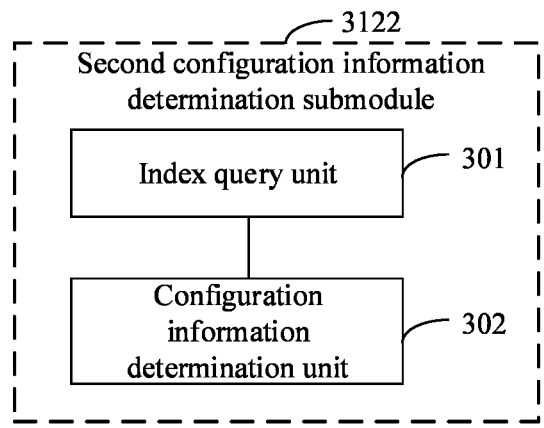
FIG. 15 is a block diagram of another information transmission device according to an exemplary embodiment of the present disclosure.

Referring to a block diagram of another information transmission device according to an exemplary embodiment in FIG. 15, based on the device embodiment shown in FIG. 14, the second configuration information determination submodule 3122 may include:

an index query unit 301, configured to query a preset index list according to the target configuration information to determine a target index corresponding to the target configuration information, the preset index list including a correspondence between a preset index and the configuration information of the preset data transmission starting positions; and a configuration information determination unit 302, configured to generate the transmission configuration information of the unlicensed spectrum according to the target index.

Figure 16:
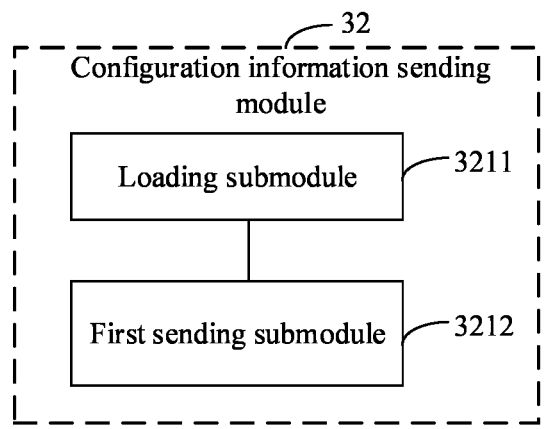
FIG. 16 is a block diagram of another information transmission device according to an exemplary embodiment of the present disclosure.

Referring to a block diagram of another information transmission device according to an exemplary embodiment in FIG. 16, based on the device embodiment shown in FIG. 11, the configuration information sending module 32 may include:

a loading submodule 3211, configured to load the transmission configuration information in target resource bits of preset signaling; and a first sending submodule 3212, configured to send the transmission configuration information to the UE through the preset signaling.

The preset signaling may include any one of:

RRC signaling, MAC CE signaling and physical-layer downlink control signaling.

Figure 17:
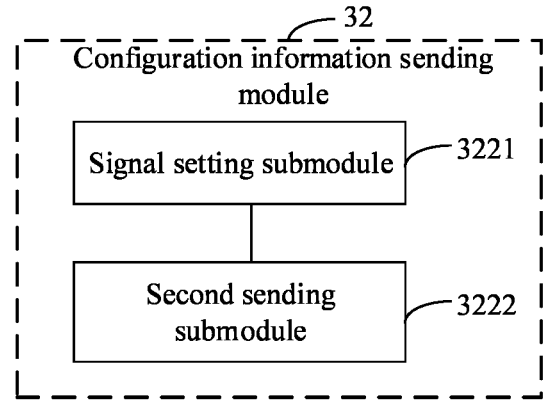
FIG. 17 is a block diagram of another information transmission device according to an exemplary embodiment of the present disclosure.

Referring to a block diagram of another information transmission device according to an exemplary embodiment in FIG. 17, based on the device embodiment shown in FIG. 11, the configuration information sending module 32 may include:

a signal setting submodule 3221, configured to configure a preset signal used for identifying the data transmission starting positions on the unlicensed spectrum in a target time-frequency resource according to the transmission configuration information; and a second sending submodule 3222, configured to send the transmission configuration information to the UE through the target time-frequency resource bearing the preset signal.

Correspondingly, the present disclosure also provides another information transmission device, which is arranged in UE.

Figure 18:
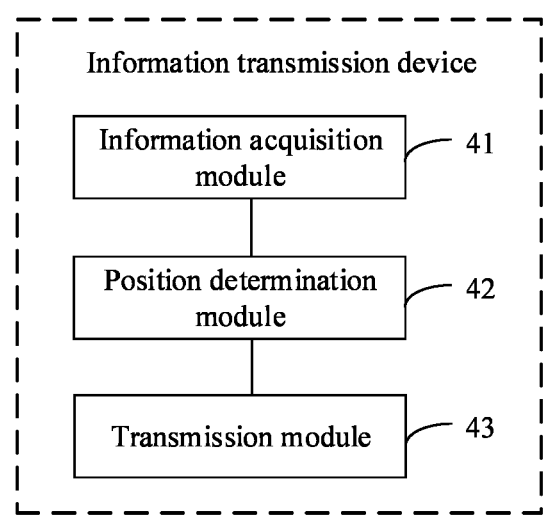
FIG. 18 is a block diagram of an information transmission device according to an exemplary embodiment of the present disclosure.

Referring to a block diagram of an information transmission device according to an exemplary embodiment in FIG. 18, the device may include:

an information acquisition module 41, configured to acquire position reference information, the position reference information being configured to determine a data transmission starting position on an unlicensed spectrum;

a position determination module 42, configured to determine the data transmission starting position on the unlicensed spectrum according to the position reference information; and a transmission module 43, configured to perform information transmission with a base station by use of a channel of the unlicensed spectrum according to the data transmission starting position.

In a device embodiment of the present disclosure, the information acquisition module 41 may be configured to acquire transmission configuration information sent by the base station for the unlicensed spectrum. The transmission configuration information is used to indicate each data transmission starting position within a preset time window.

In an embodiment of the present disclosure, the transmission configuration information may include indication information of each data transmission starting position in the preset time window.

Correspondingly, the position determination module 42 may be configured to determine the data transmission starting position on the unlicensed spectrum according to the transmission configuration information.

In another device embodiment of the present disclosure, if the transmission configuration information received by the information acquisition module 41 includes a target index, the position determination module 42 may be configured to query a preset index list according to the target index to determine target configuration information, corresponding to the target index, of the data transmission starting positions, the preset index list including a correspondence between a preset index and configuration information of data transmission starting positions.

In another device embodiment of the present disclosure, the information acquisition module 41 may be configured to detect a preset signal used for identifying the data transmission starting position on the unlicensed spectrum; and correspondingly, the position determination module 42 may be configured to determine the data transmission starting position on the unlicensed spectrum according to a preset transmission position configuration rule and position information of the preset signal.

Figure 19:
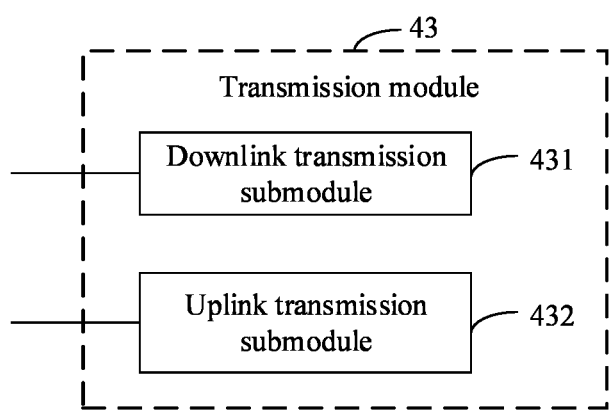
FIG. 19 is a block diagram of another information transmission device according to an exemplary embodiment of the present disclosure.

Referring to a block diagram of another information transmission device according to an exemplary embodiment in FIG. 19, based on the device embodiment shown in FIG. 18, the transmission module 43 may include at least one of the following submodules:

a downlink transmission submodule 431, configured to acquire downlink data sent by the base station through the channel of the unlicensed spectrum according to the data transmission starting position; or an uplink transmission submodule 432, configured to transmit uplink data to the base station through the channel of the unlicensed spectrum according to the data transmission starting position.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions. Those of ordinary skill in the art may understand and implement without creative work.

Correspondingly, an aspect of the present disclosure provides a base station, which includes:

a processor; and a memory configured to store an instruction executable by the processor, wherein the processor is configured to:

determine transmission configuration information of an unlicensed spectrum, the transmission configuration information being used to indicate each data transmission starting position in a preset time window;

send the transmission configuration information to UE; and perform information transmission with the UE using a channel of the unlicensed spectrum according to the transmission configuration information.

Another aspect provides UE, which includes:

a processor; and a memory configured to store an instruction executable by the processor, wherein the processor is configured to:

acquire position reference information, the position reference information being used to determine a data transmission starting position on an unlicensed spectrum;

determine the data transmission starting position on the unlicensed spectrum according to the position reference information; and perform information transmission with a base station using a channel of the unlicensed spectrum according to the data transmission starting position.

Figure 20:
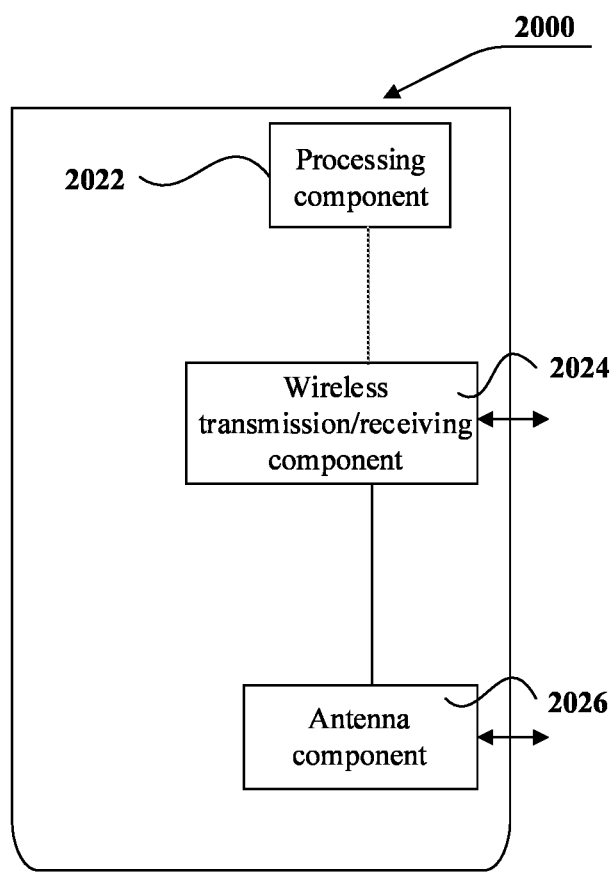
FIG. 20 is a structure diagram of a base station according to an exemplary embodiment of the present disclosure.

As shown in FIG. 20, FIG. 20 is a structure diagram of a base station 2000 according to an exemplary embodiment. The base station may be applied to a 5G NR network. Referring to FIG. 20, the base station 2000 includes a processing component 2022, a wireless transmission/receiving component 2024, an antenna component 2026 and a wireless interface-specific signal processing part, and the processing component 2022 may further include one or more processors.

The processor may be configured to determine transmission configuration information of an unlicensed spectrum, the transmission configuration information being configured to indicate each data transmission starting position in a preset time window, send the transmission configuration information to UE and perform information transmission with the UE by use of a channel of the unlicensed spectrum according to the transmission configuration information.

In an exemplary embodiment, there is also provided a non-transitory computer-readable storage medium including an instruction, in which a computer instruction is stored, and the computer instruction may be executed by the processing component 2022 of the base station 2000 to implement the information transmission method as shown in any one of FIG. 1 to FIG. 8. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 21:
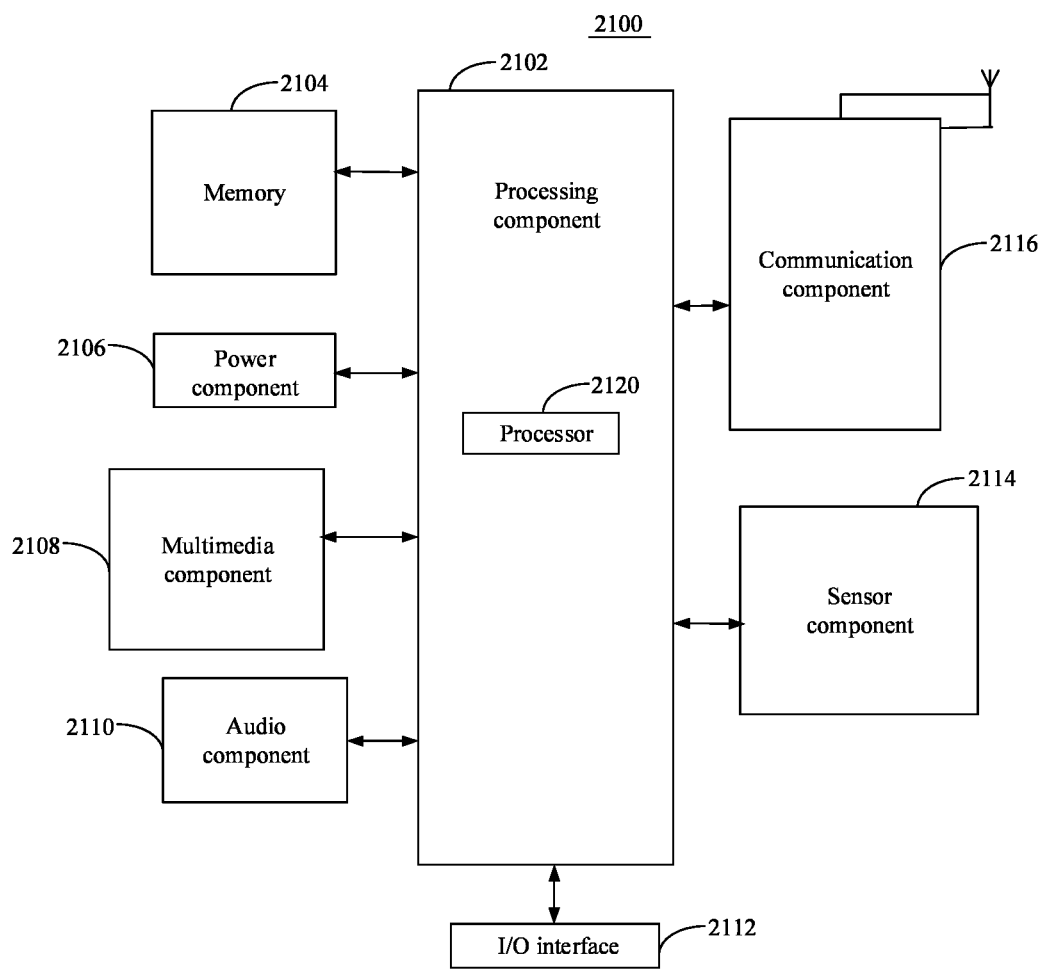
FIG. 21 is a structure diagram of UE according to an exemplary embodiment of the present disclosure.

FIG. 21 is a structure diagram of UE 2100 according to an exemplary embodiment. For example, the UE 2100 may be a terminal in a 5G NR network, and may specifically be a mobile phone, a computer, a digital broadcast terminal, a messaging device, a gaming console, a tablet, a medical device, exercise equipment, a personal digital assistant and a wearable device such as a smart watch, smart glasses, a smart band and smart running shoes.

Referring to FIG. 21, the UE 2100 may include one or more of the following components: a processing component 2102, a memory 2104, a power component 2106, a multimedia component 2108, an audio component 2110, an Input/Output (I/O) interface 2112, a sensor component 2114, and a communication component 2116.

The processing component 2102 typically controls overall operations of the device 2100, such as the operations associated with display, telephone calls, data communications, camera operations, and recording operations. The processing component 2102 may include one or more processors 2120 to execute instructions to perform all or part of the steps in the abovementioned method. Moreover, the processing component 2102 may include one or more modules which facilitate interaction between the processing component 2102 and the other components. For instance, the processing component 2102 may include a multimedia module to facilitate interaction between the multimedia component 2108 and the processing component 2102.

The memory 2104 is configured to store various types of data to support the operation of the device 2100. Examples of such data include instructions for any applications or methods operated on the device 2100, contact data, phonebook data, messages, pictures, video, etc. The memory 2104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a ROM, a magnetic memory, a flash memory, and a magnetic or optical disk.

The power component 2106 provides power for various components of the device 2100. The power component 2106 may include a power management system, one or more power supplies, and other components associated with generation, management and distribution of power for the device 2100.

The multimedia component 2108 includes a screen providing an output interface between the device 2100 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 2108 includes a front camera and/or a rear camera. The front camera and/or the rear camera may receive external multimedia data when the device 2100 is in an operation mode, such as a photographing mode or a video mode. Each of the front camera and the rear camera may be a fixed optical lens system or have focusing and optical zooming capabilities.

The audio component 2110 is configured to output and/or input an audio signal. For example, the audio component 2110 includes a Microphone (MIC), and the MIC is configured to receive an external audio signal when the device 2100 is in the operation mode, such as a call mode, a recording mode and a voice recognition mode. The received audio signal may further be stored in the memory 2104 or sent through the communication component 2116. In some embodiments, the audio component 2110 further includes a speaker configured to output the audio signal.

The I/O interface 2112 provides an interface between the processing component 2102 and a peripheral interface module, and the peripheral interface module may be a keyboard, a click wheel, a button and the like. The button may include, but not limited to: a home button, a volume button, a starting button and a locking button.

The sensor component 2114 includes one or more sensors configured to provide status assessment in various aspects for the device 2100. For instance, the sensor component 2114 may detect an on/off status of the device 2100 and relative positioning of components, such as a display and small keyboard of the device 2100, and the sensor component 2114 may further detect a change in a position of the device 2100 or a component of the device 2100, presence or absence of contact between the user and the device 2100, orientation or acceleration/deceleration of the device 2100 and a change in temperature of the device 2100. The sensor component 2114 may include a proximity sensor configured to detect presence of an object nearby without any physical contact. The sensor component 2114 may also include a light sensor, such as a Complementary Metal Oxide Semiconductor (CMOS) or Charge Coupled Device (CCD) image sensor, configured for use in an imaging application. In some embodiments, the sensor component 2114 may also include an acceleration sensor, a gyroscope sensor, a magnetic sensor, a pressure sensor or a temperature sensor.

The communication component 2116 is configured to facilitate wired or wireless communication between the device 2100 and another device. The device 2100 may access a communication-standard-based wireless network, such as a WiFi network, a 2nd-Generation (2G) or 3rd-Generation (3G) network, a 4G LTE network, a 5G network or a combination thereof. In an exemplary embodiment, the communication component 2116 receives a broadcast signal or broadcast associated information from an external broadcast management system through a broadcast channel. In an exemplary embodiment, the communication component 2116 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a BT technology and another technology.

In an exemplary embodiment, the device 2100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

Figure 10:
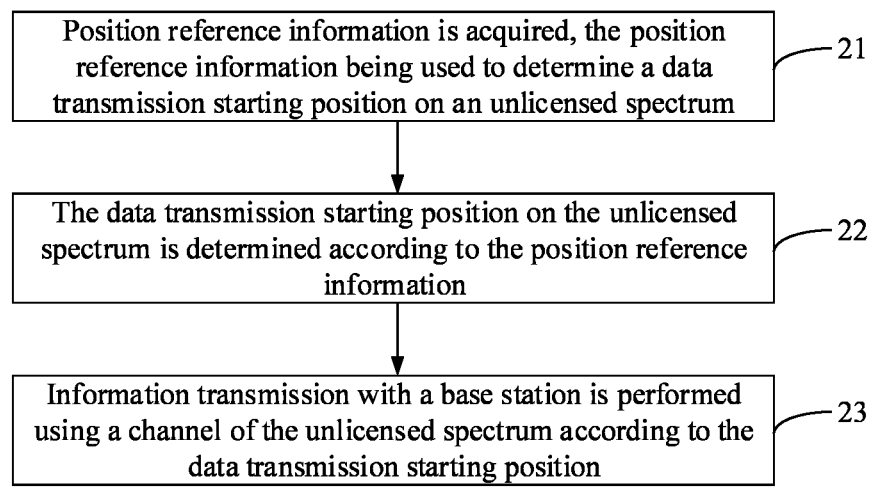
FIG. 10 is a flow chart showing an information transmission method according to an exemplary embodiment of the present disclosure.

In an exemplary embodiment, there is also provided a non-transitory computer-readable storage medium including an instruction, such as the memory 2104 including an instruction, and the instruction may be executed by the processor 2120 of the device 2100 to implement the information transmission method as shown in FIG. 10. For example, the non-transitory computer-readable storage medium may be a ROM, a RAM, a CD-ROM, a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information transmission method, applied to a base station and comprising:
   determining transmission configuration information of an unlicensed spectrum, the transmission configuration information being configured to indicate each data transmission starting position in a preset time window;
   sending the transmission configuration information to user equipment (UE); and
   performing information transmission with the UE using a channel of the unlicensed spectrum according to the transmission configuration information,
   wherein determining the transmission configuration information of the unlicensed spectrum comprises:
   querying a preset transmission configuration list according to preset reference information to determine target configuration information of data transmission starting positions in the preset time window, the preset transmission configuration list comprising a correspondence between preset reference information and configuration information of preset data transmission starting positions; and determining the transmission configuration information of the unlicensed spectrum according to the target configuration information.

2. The method of claim 1, wherein determining the transmission configuration information of the unlicensed spectrum comprises:

monitoring a channel condition of the unlicensed spectrum; and determining the transmission configuration information of the unlicensed spectrum according to the channel condition of the unlicensed spectrum.

3. The method of claim 1, wherein determining the transmission configuration information of the unlicensed spectrum according to the target configuration information comprises:

querying a preset index list according to the target configuration information to determine a target index corresponding to the target configuration information, the preset index list comprising a correspondence between a preset index and the configuration information of the preset data transmission starting positions; and generating the transmission configuration information of the unlicensed spectrum according to the target index.

4. The method of claim 1, wherein sending the transmission configuration information to the UE comprises:

loading the transmission configuration information in target resource bits of preset signaling; and sending the transmission configuration information to the UE through the preset signaling, wherein the preset signaling comprises any one of:

Radio Resource Control (RRC) signaling, Medium Access Control (MAC) Control Element (CE) signaling and physical-layer downlink control signaling.

5. The method of claim 1, wherein sending the transmission configuration information to the UE comprises:

configuring a preset signal configured to identify data transmission starting positions on the unlicensed spectrum in a target time-frequency resource according to the transmission configuration information; and sending the transmission configuration information to the UE through the target time-frequency resource carrying the preset signal.

6. The method of claim 1, wherein performing information transmission with the UE using the channel of the unlicensed spectrum according to the transmission configuration information comprises:

responsive to that an idle channel resource of the unlicensed spectrum is detected, sending downlink data to the UE according to the transmission configuration information.

7. A base station, comprising:

a processor; and a memory configured to store an instruction executable by a processor, wherein the processor is configured to perform the method of claim 1.

8. An information transmission method, applied to user equipment (UE) and comprising:

acquiring position reference information, the position reference information being configured to determine a data transmission starting position on an unlicensed spectrum;

determining the data transmission starting position on the unlicensed spectrum according to the position reference information; and performing information transmission with a base station using a channel of the unlicensed spectrum channel according to the data transmission starting position, wherein acquiring the position reference information comprises:

acquiring transmission configuration information sent by the base station for the unlicensed spectrum, the transmission configuration information being configured to indicate each data transmission starting position in a preset time window, wherein the transmission configuration information is determined by the base station by:

querying a preset transmission configuration list according to preset reference information to determine target configuration information of data transmission starting positions in the preset time window, the preset transmission configuration list comprising a correspondence between preset reference information and configuration information of preset data transmission starting positions, and determining the transmission configuration information of the unlicensed spectrum according to the target configuration information.

9. The method of claim 8, wherein determining the data transmission starting position on the unlicensed spectrum according to the position reference information comprises:

determining the data transmission starting position on the unlicensed spectrum according to the transmission configuration information.

10. The method of claim 9, wherein the transmission configuration information comprises a target index; and determining the data transmission starting position on the unlicensed spectrum according to the transmission configuration information comprises:

querying a preset index list according to the target index to determine target configuration information, corresponding to the target index, of the data transmission starting position, the preset index list comprising a correspondence between a preset index and configuration information of data transmission starting positions.

11. The method of claim 8, wherein the transmission configuration information comprises indication information of each data transmission starting position in the preset time window.

12. The method of claim 8, wherein acquiring the position reference information comprises:

detecting a preset signal configured to identify the data transmission starting position on the unlicensed spectrum; and determining the data transmission starting position on the unlicensed spectrum according to a preset transmission position configuration rule and position information of the preset signal.

13. The method of claim 8, wherein performing information transmission with the base station using the unlicensed spectrum channel according to the data transmission starting position comprises at least one of:

acquiring downlink data sent by the base station through the channel of the unlicensed spectrum according to the data transmission starting position; or transmitting uplink data to the base station through the channel of the unlicensed spectrum according to the data transmission starting position.

14. User equipment (UE), comprising:
a processor; and
a memory configured to store an instruction executable by a processor,
wherein the processor is configured to perform the method of claim 8.

\* \* \* \* \*